United States Patent [19]
Feingold

[11] 3,858,798
[45] Jan. 7, 1975

[54] LETTERING LAYOUT CALCULATOR
[76] Inventor: Jeffrey Feingold, 28 Wendell St., Apt. 22, Cambridge, Mass. 02138
[22] Filed: Aug. 3, 1973
[21] Appl. No.: 385,487

[52] U.S. Cl.................. 235/83, 235/88 R, 235/116
[51] Int. Cl.......................................... G06c 27/00
[58] Field of Search............ 235/77, 78, 83, 84, 88, 235/102, 116, 122

[56] References Cited
UNITED STATES PATENTS

| | | | |
|---|---|---|---|
| 509,722 | 11/1893 | Dalton et al. | 235/83 |
| 2,586,058 | 2/1952 | Knopke | 235/88 X |
| 3,281,072 | 10/1966 | Dawson | 235/88 X |
| 3,785,553 | 1/1974 | Brown | 235/80 |

Primary Examiner—Lawrence R. Franklin
Attorney, Agent, or Firm—Friedman & Goodman

[57] ABSTRACT

A lettering layout calculator for calculating the total length of a group of characters of a predetermined type face and point size includes two planar sheets in the form of flat discs which are pivotally connected to one another. One of the discs is provided with a series of uniformly spaced holes circularly arranged about the pivot point thereof and is further provided with at least one scale imprinted thereon at least a portion of which is visible through the other planar sheet. The second planar sheet, normally facing the user of the calculator, is provided with a plurality of arcuate slots each representing characters having equal widths and forming arcs of concentric circles about the pivot point. Each arcuate slot is disposed opposite a different number of holes in the first disc corresponding to the width of a character represented by the respective arcuate slot. In this manner, engagement of one of the holes with a pointed object and dialing the first planar disc relative to the second planar disc and moving the holes a number of spaces represented by the arcuate slot advances the scale relative to the second planar disc to provide an indication of the length of the dialed characters.

9 Claims, 9 Drawing Figures

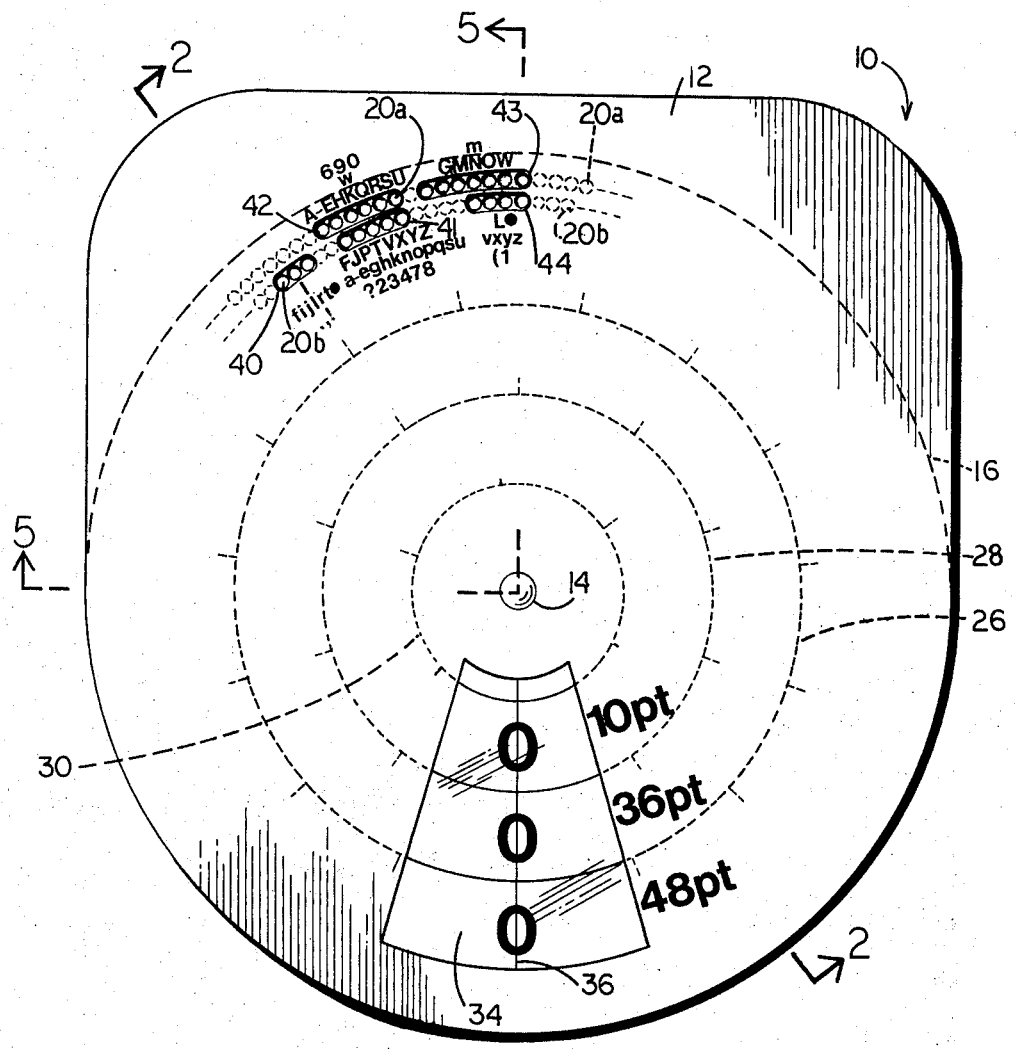
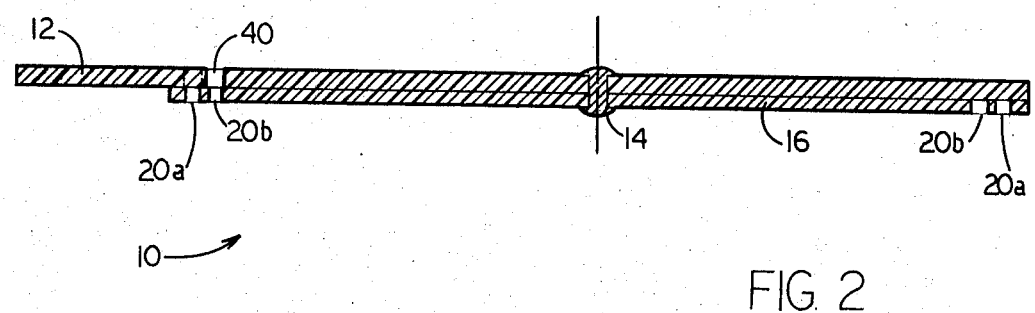
FIG. 1
FIG. 2

LETTERING LAYOUT CALCULATOR

BACKGROUND OF THE INVENTION

The present invention generally relates to circular calculators, and more particularly to a circular calculator for calculating the total length of a group of characters of a predetermined type face and point size.

Circular calculators, in the form of mathematical teaching wheels and conversion wheels are well known in the art. Typically, two or more planar sheets or discs are pivotally connected to one another, some of the discs being provided with imprinted data thereon and the other of said discs being provided with information windows which permit viewing of select portions of the imprinted data in predetermined or preprogrammed positions of the discs relative to one another. The various arrangements and purposes of the disc calculators of this type are numerous and varied. However, disc calculators of the type under discussion have not heretofore been utilized to facilitate lettering layout.

Laying out lettering on a poster, mechanical drawing or chart, for example, requires that the length of a word or words be calculated to assure there is provided sufficient space for the words without cluttering the letters too close to one another. This latter calculation must be made when a predetermined type face and point size lettering is to be utilized. Alternately, where the point size may be selected to accommodate a fixed space, it is necessary to determine which point size is most appropriate to provide the largest possible letters while not exceeding the allotted space.

To carry out the above described procedures one can estimate, based on experience, the amount of space required with the point size to be used. Alternately, the width of the individual letters are measured to determine the total width of the word or words which are to be formed. While this approach provides accurate information as to the length of the space required, this procedure is inconvenient and time consuming. To facilitate this procedure, tables have been tabulated which provide the widths of the individual letters of a given type face and point size. However, these tabulations still require that the individual widths of the letters be manually added, taking into account the gaps between the letters and words.

With reference to dry transfer lettering, markoff distances or space marks associated with each letter may be provided. When such marks are provided, the total length of a word or line of lettering can be estimated by marking off the distances between the space marks of each letter, making due allowance for the widths of gaps between words. Again, this method is tedious and time consuming.

SUMMARY OF THE INVENTION

It is an object of the present invention to provide a lettering layout calculator which facilitates the calculation of the total length of a group of characters of a predetermined type face and point size.

It is another object of the present invention to provide a lettering layout calculator which is simple in construction and economical to manufacture.

It is still another object of the present invention to provide a lettering layout calculator which can be utilized both for estimating the total length of a group of characters of a predetermined type face and point size and which permits the selection of a type face and point size which will most closely fill a fixed space.

It is yet another object of the present invention to provide a lettering layout calculator of the type under discussion which is simple to utilize and which does not require manual calculations.

It is a further object of the present invention to provide a lettering layout calculator as above described which permits the calculation of the total length of a group of characters of a predetermined type face and point size without the need to measure said characters or to utilize tabulations of widths of the characters.

To achieve the above objects, as well as others which will become apparent hereafter, a calculator for calculating the total length of a group of characters of a predetermined type face and point size includes first and second planar members connected for pivotal rotation relative to one another. Said first planar member is provided with at least one series of uniformly spaced engaging means circularly arranged about the pivot point of said planar members and further provided with at least one scale imprinted thereon at least a portion of which is visible through said second planar member. Said second planar member is provided with a plurality of arcuate slots each representing characters having equal widths and forming arcs of concentric circles about the pivot point. Each arcuate slot is disposed opposite a different number of said engaging means corresponding to a width of a character represented by the arcuate slot. In this manner, engagement and dialing of said first planar member relative to said second planar member and movement of said engaging means a number of spaces represented by said arcuate slots advances said scale relative to said second planar member to provide an indication of the length of the dialed characters.

In the presently preferred embodiment, said scale is circularly disposed on said first planar member. Said first planar member is provided with a transparent portion which permitms viewing at least a portion of the scale therethrough. A hairline is imprinted on said transparent portion which extends in a radial direction. In this manner, said hairline overlies said scale to provide precise readings thereof.

The presently preferred embodiment of said engaging means comprises spaced apertures in said first planar member. Where said first planar member is in the form of a circular disc, said spaced apertures are advantageously in the form of spaced holes circumferentially disposed in the region of the periphery of said disc and arranged for successive passage in opposed relation to said arcuate slots. In this manner, a pointed object can be received simultaneously through one of the holes disposed at one end of an arcuate slot and through the latter to dial said disc and said scale relative to said second planar member by movement of the pointed object from one end of said arcuate slot to the other end thereof.

In the presently preferred embodiment, two series of equally numbered and uniformly spaced engaging means in the form of apertures are circumferentially arranged concentrically about the pivot point. Said apertures comprise equal diameter holes. The spacing between said holes in each respective series are proportional to the radial distance of the respective apertures from the pivot point. Some of said arcuate slots are disposed opposite one of said two series of engaging means and the remaining arcuate slots are disposed opposite the other of said two series of engaging means.

Advantageously, a plurality of concentric scales are provided on said first planar member, at least a portion of each of said scales being visible through said second planar member. To facilitate reading of the desired information, said second planar member is preferably opaque and is provided with a transparent portion through which said scales are visible.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 1 is a top plan view of a lettering layout calculator in accordance with the present invention, showing arcuate slots and a transparent portion formed thereon, and holes formed in a pivotally connected disc which are exposed through the arcuate slots and scales imprinted on the pivotally mounted disc at least portions of which are exposed through the transparent portion;

FIG. 2 is a cross section of the calculator shown in FIG. 1, taken along line 2—2;

DETAILED DESCRIPTION OF THE PREFERRED EMBODIMENTS

Figure 3:
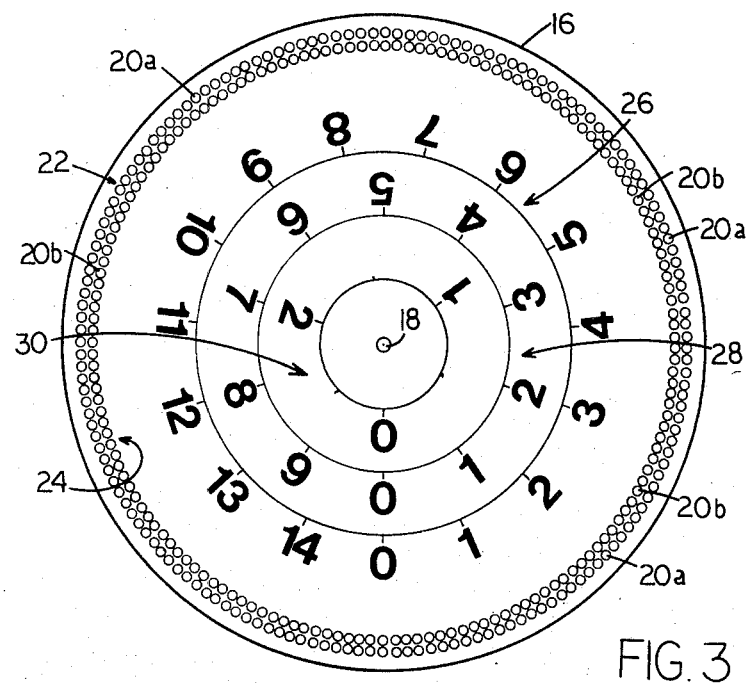
FIG. 3 is a top plan view of the pivotally mounted disc shown in outline in FIG. 1, showing the details of the construction as well as the imprinted scale thereon.

Referring now to the FIGURES, in which the same reference numerals have been utilized to designate similar or identical parts throughout, and first referring to FIGS. 1 and 2, a lettering layout calculator is shown and generally designated by the reference numeral 10.

The calculator 10 includes an upper planar member in the form of a plastic sheet or disc 12 pivotally connected by means of a pin 14 to a lower planar member in the form of a plastic sheet or disc 16. The references to direction in the latter description are arbitrary and refer to directions of the calculator as shown in FIGS. 1 and 2. Under normal use, the calculator 10 is utilized with the disc 12 facing the user with the disc 16 being disposed behind the disc 12. Only portions of the disc 16 are visible to the user, as to be described hereafter.

Figure 4:
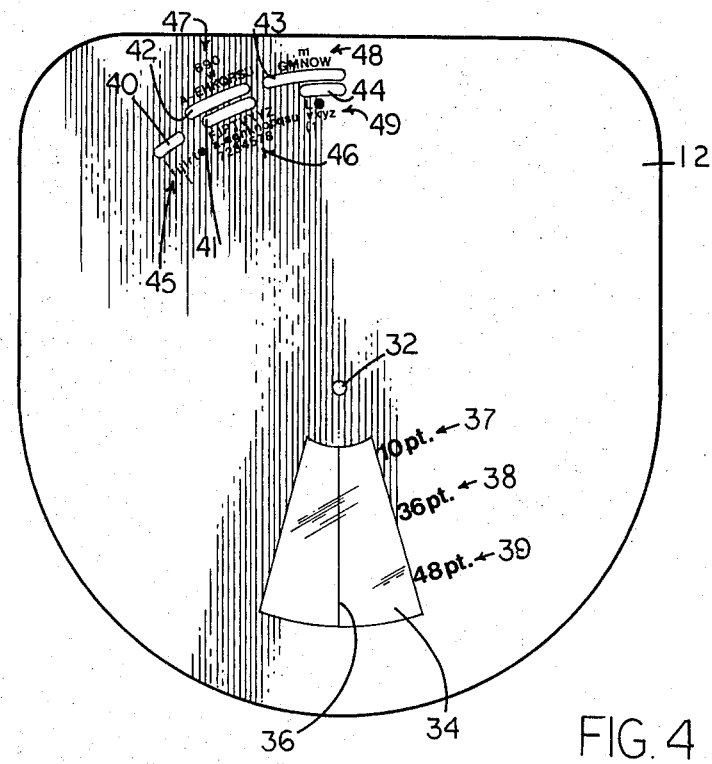
FIG. 4 is a top plan view of the upper planar sheet, shown in FIG. 1.
Figure 5:
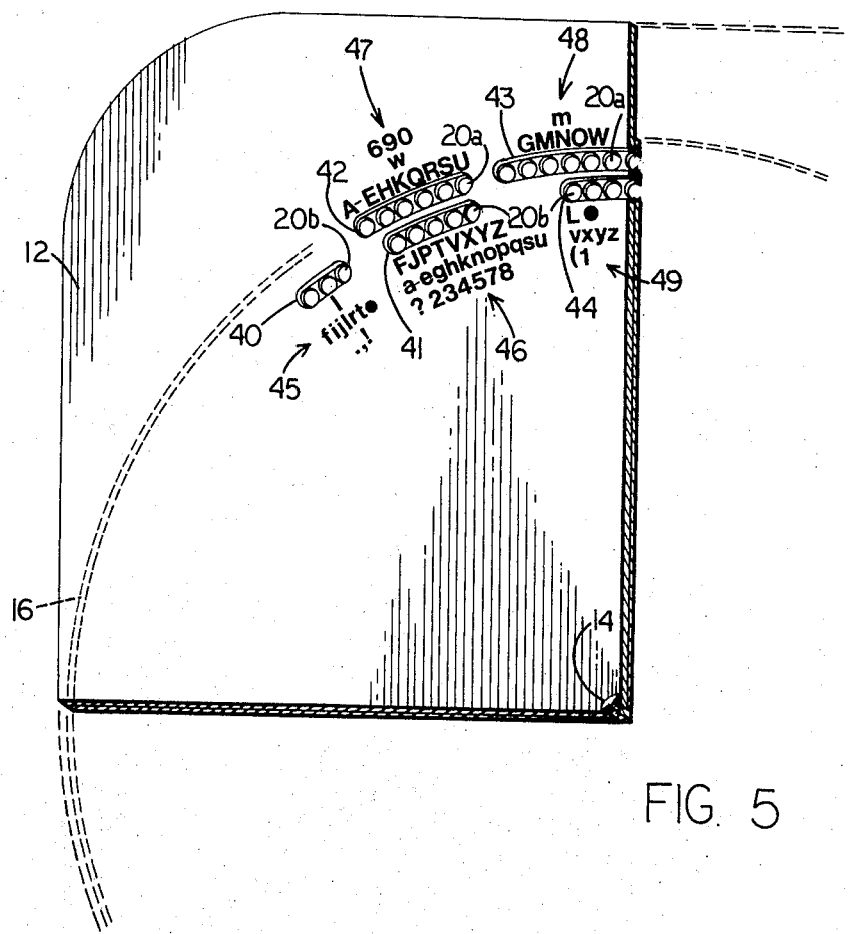
FIG. 5 is an enlarged cross sectional view of a quadrant of the calculator shown in FIG. 1, taken along line 5-5.

The planar plastic sheet 12 is shown in FIGS. 1, 4 and 5 provided with two rounded corners which are suitable for holding the calculator during use. However, the specific outline of the sheet 12 is not critical for the purposes of the present invention and any suitable outline may be selected.

Referring to FIG. 3, the lower disc 16 is provided with a center hole or aperture 18 which receives the pin 14 in the assembled condition of the calculator.

A plurality of uniformly spaced engaging means in the form of apertures or holes 20a are circularly arranged about the pivot point or hole 18 to form an outer series 22 of such holes. Similarly, a plurality of engaging means in the form of apertures or holes 20b are circularly arranged about the hole 18 concentrically with the series 22 to form an inner series 24 of uniformly spaced holes. In the presently preferred embodiment, the holes 20a and 20b have equal diameters and an equal number of holes are provided in each of the series 22 and 24. More specifically, 160 holes are provided in each of the series. The number of holes for this purpose is selected to correspond to the scales imprinted on the disc 16, as to be more fully described hereafter.

while the holes have been shown to be circumferentially disposed in the region of the periphery of the disc 16, it will become apparent from the description that follows that the holes need not, to achieve the objects of the present invention, be so disposed. The principle of the present invention can be carried out substantially independently of the radial distance at which the series of holes are arranged. Further, although circular apertures or holes are disclosed, any other suitable engaging means which performs the same or similar function can be utilized instead of the holes. Thus, it is possible, for example, to provide indentations in the disc 16 which can be engaged by a suitable tool or implement such as a pointed object. It is only important that the disc 16 remain engageable and freely rotatable about the pin 14.

The lower disc 16 is further provided with at least one scale imprinted thereon. In the preferred embodiment, shown in FIG 3, three concentric scales 26, 28 and 30 are shown. The calculator to be described has scales selected to calculate the total length of a group of characters of a predetermined type face, namely the type face commonly known as "Helvetica." For this type face, the scale 26 represents letters having a 48 point size, the scale 28 represents 36 point size and the scale 30 represents 10 point size letters.

The manner of selecting the number of holes 20a, 20b and the scales 26, 28 and 30 will be set forth hereafter.

The upper planar member 12 is provided with a center hole 32 through which the pivot pin extends when the calculator 10 is assembled. Referring to FIGS. 1, 4 and 5, the upper planar sheet or member 12 is advantageously selected to be opaque to completely or substantially cover the scales 26, 28 and 30 from view of the user. A radial transparent portion or information window 34 is provided which permits the viewing of at least portions of the imprinted scales 26, 28 and 30 when the two discs are rotatably assembled as shown in FIGS. 1, 2 and 5–9.

Where the scales are circular as shown in FIG. 3, a hairline marker 36 is provided on said transparent portion which extends in a radial direction. For example, the hairline marker 36 may be imprinted on the transparent portion. In this manner, the hairline marking overlies the scales to provide precise readings thereof. Thus, the transparent portion 34 is in the form of an information window which selectively exposes portions of the scales of interest for reading the desired data without the user being distracted by other portions of the circular scales.

Imprinted on the upper planar sheet or disc 12, at radial distances corresponding to the radii of the circular scales, is information 37, 38 and 39 which designates the point sizes of the lettering to which the associated scales are calibrated. The manner in which this information is utilized will be described hereafter.

The upper planar sheet or member 12 is further provided with a plurality of arcuate slots 40-44 each representing characters having equal widths. Each of the arcuate slots forms an arc of a concentric circle about the pivot pin 14. As best shown in FIGS. 1 and 5, each arcuate slot is disposed opposite a different number of the spaced holes corresponding to the width of a character represented by the respective arcuate slots. With the "Helvetica" type face under consideration, all the letters, alphanumeric and numeric, as well as symbols and punctuations commonly utilized, can be separated into five groups. Each of the characters within each group has the same width for a given point size. The manner of classifying the letters into the groups is not critical for the purposes of the present invention. Thus, the widths of the letters may be measured directly from reference guides, taken from charts or tabulations, or measured by measuring the guide space marks provided on dry transfer letter sheets. Whichever measurements are most pertinent or most accurate may be used. However, once the mode of measurement of the widths of the letters has been selected, all the letters and characters can be measured by the selected mode. After the widths for each of the letters and characters has been obtained, these can be classified into groups of equal widths. The degree of accuracy desired may determine, in some instances, the number of groups which may result. In the presently preferred embodiment, wherein the "Helvetica" type face is being considered, the widths of the letters between guide space marks are measured to the closest one-sixteenth of an inch. It has been found that measuring the widths of the characters in one-sixteenth of an inch provides accurate width dimensions for most of the characters and very little approximation or rounding off is required.

When the "Helvetica" type face is measured in one-sixteenth of an inch, all the characters and commonly used symbols can be classified into five groups as follows:

TABLE I

"HELVETICA" TYPE FACE
36 PT. SIZE CHARACTERS

| | GROUP 1 - 2/16" widths |
|---|---|
| upper case: | I |
| lower case: | f, i, j, l, r, t, space (lower case words) |
| symbols: | ". " " " ". |

| | GROUP 2 - 3/16" widths |
|---|---|
| upper case: | L, space (upper case words) |
| lower case: | v, x, y, z |
| symbols: | 1, ) , ( |

| | GROUP 3 - 4/16" widths |
|---|---|
| upper case: | F, J, P, T, V, X, Y, Z |
| lower case: | a, b, c, d, e, g, h, k, n, o, p, q, s, u |
| symbols: | ?, 2, 3, 4, 5, 7, 8 |

| | GROUP 4 - 5/16" widths |
|---|---|
| upper case: | A, B, C, D, E, H, K, Q, R, S, U |
| lower case: | w, |
| symbols: | 6, 9, 0 |

| | GROUP 5 - 6/16" widths |
|---|---|
| upper case: | G, M, N, O, W |
| lower case: | m |

As will be noted the first group represents all letters and characters which are two-sixteenths in width, the second group representing characters equal to three-sixteenths in width and so on. The widest characters have been classified in Group 5 wherein the letters and characters are six-sixteenths in width. Clearly, the letters and characters could equally be measured in one thirty-second of an inch or in still smaller units. However, extreme accuracy is frequently not necessary in laying out lettering. Close estimates or approximations are frequently sufficient to assist an artist or draftsman in laying out or planning the lettering. As suggested above, where the characters are measured in smaller units, this may result in a greater number of groups each representing different widths of the letters and characters.

Referring to FIGS. 1, 4 and 5, it will thus be noted that each of the arcuate slots 40-44 respectively represents a different group of characters set forth in the above Table I. To accommodate spaces between words, a large dot or other convenient symbols is provided in the first group, representing a space of two-sixteenths of an inch for lower case words. Similarly, a large dot or other suitable symbol is provided in the second group and represents a space of three-sixteenths of an inch to designate a space between upper case words.

In the presently preferred embodiment, each of the arcuate slots 40-44 forms an arc of a concentric circle about the pivot pin 14. Each arcuate slot is disposed opposite a different number of the holes, the number of holes being exposed by each slot being equal to one more than that corresponding to the width in one-sixteenth of an inch of the characters represented by the respective arcuate slot. Thus, arcuate slot 40 exposes three holes 20b and represents those letters and characters which are two-sixteenths of an inch. The slot 44 exposes four holes 20b and represents the letters and characters in Group 2 set forth in the above table each having three-sixteenths of an inch width. Similarly, the slots 41, 42 and 43 are respectively oppositely disposed 5, 6, and 7 holes and respectively represent the characters in the Groups 3, 4 and 5 set forth in the above table. In each instance, the number of holes exposed is one more than the number of sixteenths which the letters or characters measure in width. The reason for the additional hole will be described below in connection with the operation of the calculator 10.

As will be noted from FIGS. 1, 3 and 5, arcuate slots 42 and 43 expose holes 20a in the outer series 22 while the slots 40, 41 and 44 expose holes 20b which form the inner series 24. This arrangement of arcuate slots with respect to the holes is not critical for the purpose of the present invention. Where two series of holes are provided, as shown in FIG. 3, it is possible to associate some of the arcuate slots with one series and the other of the arcuate slots with the other series. This, however, is mostly for aesthetic and convenience reasons in order to group all the slots in one region of the calculator. However, this does not form a critical part of the present invention. Thus, it is possible to provide a single series of holes as described above and arrange all the arcuate slots at a common radial distance to expose corresponding numbers of holes of the single series. Irrespective of the manner in which the arcuate slots are arranged or how many series of holes are provided, it is merely necessary that each of the arcuate slots have a different length to expose a different number of holes corresponding to the width of the characters represented by the slot.

The above described character width measurements of the "Helvetica" type face, for constructing the scales 26, 28 and 30, have been made on 36 point size type. A convenient diameter for each of the holes 20a, 20b was selected equal to one-eighth of an inch diameter. The diameters of the holes 20a, 20b are selected to permit insertion therein or therethrough of a pointed object such as a pencil point. With the size holes selected, 160 holes could be disposed around the disc 16 in each circular series of a given diameter. Accordingly, the angular spacing between each two adjacent holes with respect to the pivot pin 14 is equal to 2-¼°. As will become clear, the angular spacing between adjacent holes in each circular series is of importance, not the diameters of the holes. With larger diameter discs, it is possible, for example, to increase the diameters of the circular series and to provide the same or large diameter holes which nevertheless are angularly spaced 2-¼° from each other. However, if smaller holes prove to be satisfactory, or if the disc is provided with a larger diameter, a greater number of holes can be provided, wherein the angular spacing between two adjacent holes in a series represent a smaller angular increment.

With 160 holes as described above, wherein each angular increment under consideration represents one-sixteenth of an inch on a linear scale, characterizing differences in widths of the character groups a total distance of 10 inches is represented by a full revolution of the disc. The middle scale 28, representing 36 point size type is therefore shown in FIG. 3 to be calibrated into ten equal increments each representing 1 inch of linear space.

The scale 26, representing 48 point size type and the scale 30, representing 10 point size type, can be derived from the measurements of the widths of the characters having a 36 point size type where the width and height dimensions of the characters increase and decrease in the same proportions. In the following Table II, the approach utilized in deriving the scales 26 and 30 for the 10 and 48 point sizes, as well as other commonly used point sizes, is illustrated.

the measurements of the heights in sixty-fourths of an inch of the characters in the various point sizes — the heights of the characters varying directly or in the same proportions as the widths of the same characters. Within each point size, as suggested above, the characters are classified into the same groups set forth in the Table I above. Therefore, Table II sets forth the means for translating the total linear length of a predetermined point size for a full 360° revolution of the disc 16. Also given in the Table II is the angular rotation of the disc 16 which represents a 1 inch linear distance in a given point size.

As noted above, the widths of each of the letters and characters have been measured for 36 point size type face and the letters and characters have been grouped according to their widths in the five groups set forth in Table I. With each hole representing one-sixteenth of an inch, 160 holes disposed about the periphery of the disc 16 represents a total distance of 10 inches. With this reference linear distance of 10 inches per one complete revolution of the disc 16, the corresponding total linear length represented by a complete revolution of the disc 16 can be obtained for any other point size by comparing the heights of the 36 point size and the point size of interest and increasing or decreasing the 10 inches reference linear length by the same ratio of the heights in sixty-fourths of an inch. Thus, for example, it is noted that the height of the 36 point size letters is equal to 0.3281 inch. The height of the 18 point size letters is 0.1562 inch, approximately one-half of the height of the 36 point inches. Therefore, since the height of the 18 point size characters are approximately one-half of the height of the 36 point size characters, the total length for one revolution of the disc 16 similarly represents approximately one-half of 10 inches, and more precisely 4.75 inches. Similarly, the 96 point size characters are approximately 3 times the height of the 36 point size characters, and, consequently, the total length represented by one revolution of the disc 16 is approximately three times 10 inches, but actually 32-⅜ inches.

Once the total length per complete revolution has been determined by means of the heights ratios as de-

TABLE II

| POINT SIZE | HEIGHTS (64ths) | "HELVETICA" TYPE FACE DECIMAL EQUIV. | 1. REV. LENGTH | 1" REPRESENTATION In degrees |
|---|---|---|---|---|
| 6 | 3 | .0468 | 1.4" | 258° |
| 8 | 5 | .0781 | 2.4" | 152° |
| *10 | 6 | .0937 | 2.9" | 126° |
| 12 | 7 | .1093 | 3.3" | 108° |
| 14 | 8 | .125 | 3.8" | 95° |
| 18 | 10 | .1562 | 4.8" | 76° |
| 24 | 15 | .2343 | 7.1 | 50° |
| 30 | 19 | .2968 | 9.05 | 40° |
| *36 | 21 | .3281 | 10.0 | 36° |
| 42 | 25 | .3906 | 11.9 | 30° |
| *48 | 32 | .5 | 15.2 | 24° |
| 60 | 39 | .6093 | 18.5 | 19° |
| 72 | 48 | .75 | 22.8 | 16° |
| 84 | 59 | .9218 | 28.25 | 13° |
| 96 | 1 4/64 | 1.0625 | 32.4 | 11° |
| 120 | 1 19/64 | 1.2968 | 39.5 | 9° |
| 144 | 1 37/64 | 1.5781 | 48.0 | 8° |
| 192 | 2 5/64 | 2.0781 | 63.2 | 6° |

*Utilized to construct scales 26, 28 and 30 in the FIGURES.

In the above Table II, the scales have been derived by scribed above, the scales may be constructed by determining the number of angular degrees which represent 1 inch of linear distance. To determine this, it is merely necessary to divide the total length represented by one revolution into 360°. Thus, for 36 point size type with a total linear length of 10 inches represented by one complete revolution, 10 subdivisions are illustrated on the scale 28, each spaced 36 angular degrees from one another. With respect to the ten point size scale, wherein one revolution represents 2 and ⅞ inches, the inch marks are angularly spaced from each other 126° apart. Half inch marks are shown on the scale 30. Similarly, for the 48 point size characters with a total of 15 and 3/16 total linear distance represented by one revolution of the disc 16, the inch marks are spaced from one another 24 angular degrees about the pivot point.

The planar sheets or members 12 and 16 may be made from any suitable material commonly used for such calculators. For example, each of the planar sheets may be made from thin mylar sheets. The opacity of the upper planar sheet 12 may be achieved by imprinting the entire surface thereof, with the exception of the transparent portion 34, with cross hatching or any suitable grid pattern.

Referring to FIGS. 1, 2 and 5–9, the operation of the calculator 10 will now be described. Initially the disc 16 is rotated relative to the planar sheet 12 about the pin 14 to bring the zero or reference markings on these scales into alignment with the hairline 36. for purposes of illustration, the word "PAN" will be dialed to determine the total length of the word in order to, for example, determine whether there is sufficient space to lay out the word in a particular point size.

Figures 6, 7, 8, 9:
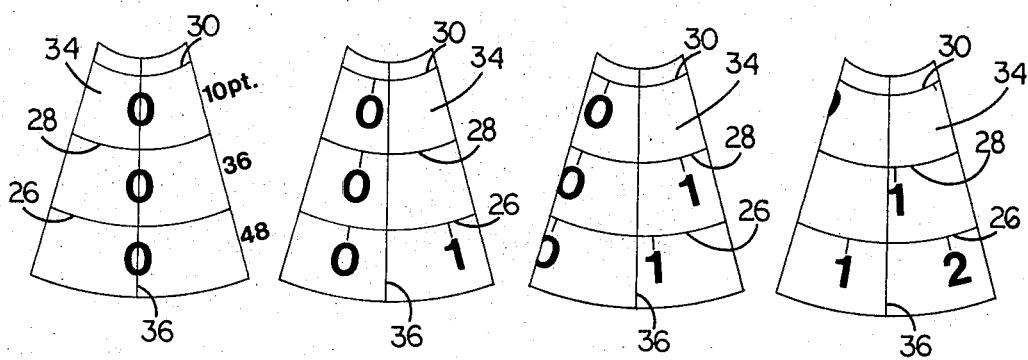
FIGS. 6–9 are schematic representations of the transparent portion formed in the sheet shown in FIG. 4, showing the scales imprinted on the disc shown in FIG. 3 in successive relative positions, representing the dialing or calculating of the length of the word "PAN."

To set or reset the calculator 10 at the beginning of a calculation, the disc 16 is rotated relative to the sheet 12 to bring the zeros of the scales 26, 28 and 30 into alignment with the hairline 36. A pointed object, such as a pencil point, is inserted into the leftmost hole 20b of the arcuate slot 41 which represents the group of characters having four-sixteenths of an inch length and which includes the upper case letter "P." With the pencil point still engaged with the hole, the pencil is moved towards the right, as viewed in the FIGURES to bring the engaged hole to the rightmost position of the slot 41. Since the engaged hole remains exposed in the slot 41 after the pencil is removed, it should be clear that the number of holes actually moved or advanced, and the number of sixteenths of an inch represented thereby, is equal to one less than the total number of holes exposed in the slot. In this instance, with five holes exposed through the slot 41, only four of those holes are moved out of the slot. Accordingly, the dialing of the disc in this fashion in conjunction with the slot 41 causes the scale 28 to move four-sixteenths of an inch, as shown in FIG. 7. Similarly, dialing of the upper case letter "A" by inserting the pencil into the slot 42 and dialing the disc 16 causes the scale 28 to move an additional five-sixteenths of an inch. Finally, dialing of the upper case letter "N" by inserting the pencil point through the slot 43 causes the scale 28 to move an additional six-sixteenths of an inch. Thus, after the word "PAN" has been dialed, the total length thereof is indicated in FIG. 9 to be equal to fifteen-sixteenths of an inch — the same distance which would have been obtained had the individual letters been measured and the widths thereof added manually.

Referring to FIG. 9, it will be noted that were the total width of the word "PAN" be of interest in a 10 point size type face, the scale 30 could be referred to determine that the total length would be one-fourth of an inch. Similarly, in viewing the scale 26 in FIG. 9 indicates that the word "PAN" in 48 point size lettering would have a total length of 1-⅜ inch.

Although only three scales have been indicated on the surface of the lower disc 16, it should be clear that by reducing the size of the scale lettering or by increasing the diameter of the disc 16, as many or as few scales may be incorporated to reflect the various point sizes of interest set forth in Table II.

Before dialing a further word, the disc 16 must be dialed to reflect the space between the words by dialing one of the large dots, for upper or lower case letters, as described above.

After the word or words of interest have been dialed, the information provided through the transparent portion or information window 34 in the final position of the disc 16 permits the draftsman or artist to make an intelligent decision as to the layout of the lettering. If a particular point size lettering must be utilized, the user is informed how much linear space is required to include the desired word or words in that point size. On the other hand, if the point size is not critical but the total length or space available is limited, the user can examine the various scales to select the one which most closely approximates the space available and select the corresponding point size which would occupy that indicated space. Therefore, the subject lettering layout calculator provides, in a rapid and convenient manner, all the information which is necessary for the purposes above suggested without the need for manual calculations and without the need to repeat such calculations by trial and error for each contemplated point size.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A calculator for calculating the total length of a group of characters of a predetermined type face and point size, the calculator comprising first and second planar members connected for pivotal rotation relative to one another, said first planar member being provided with at least one series of uniformly spaced engaging means circularly arranged about the pivot point of said planar members and further being provided with a plurality of concentric calibrated scales imprinted thereon at least portions of which are visible through said second planar member, each scale being associated with another type face point size, said second planar member being provided with a plurality of arcuate slots each representing characters having equal widths and forming arcs of concentric circles about the pivot point, each arcuate slot being disposed opposite a different number of said engaging means corresponding to the width of a character represented by the respective arcuate slot, whereby engagement and dialing of said first planar member relative to said second planar member and movement of said engaging means a number of spaces represented by said arcuate slot advances said scales relative to said second planar member to simultaneously provide indications of the respective lengths of the dialed characters in each of the type face point sizes for which said scales have been calibrated.

2. A calculator as defined in claim 1, wherein said second planar member is provided with a transparent portion, said scale being provided on the surface of said first planar member facing said second planar member, whereby at least a portion of said scale is visible through said transparent portion.

3. A calculator as defined in claim 2, wherein said scale is circularly disposed on said first planar member, further comprising a hairline imprinted on said transparent portion which extends in a radial direction, whereby said hairline overlies said scale to provide precise readings thereof.

4. A calculator as defined in claim 1, wherein said engaging means comprises spaced apertures in said first planar member.

5. A calculator as defined in claim 4, wherein said first planar member is in the form of a circular disc, and wherein said spaced apertures are in the form of spaced holes circumferentially disposed in the region of the periphery of said disc and arranged for successive passage in opposed relation to said arcuate slots, whereby a pointed object can be received simultaneously through one of the holes disposed at one end of an arcuate slot and through the latter to dial said disc and said scale relative to said second planar member by movement of the pointed object from one end of said arcuate slot to the other end thereof.

6. A calculator as defined in claim 1, wherein two series of equally numbered and uniformly spaced engaging means are circularly arranged concentrically about the pivot point.

7. A calculator as defined in claim 6, wherein said apertures comprise equal diameter holes, the spacing between said holes in each respective series being proportional to the radial distance of the respective apertures.

8. A calculator as defined in claim 6, wherein some of said arcuate slots are disposed opposite one of said two series of engaging means and the remaining arcuate slots are disposed opposite the other of said two series of engaging means.

9. A calculator as defined in claim 1, wherein said second planar member is opaque and is provided with a transparent portion through which said scale is visible.

* * * * *